(12) United States Patent
Nomura et al.

(10) Patent No.: US 12,474,217 B2
(45) Date of Patent: Nov. 18, 2025

(54) INSPECTION METHOD

(71) Applicant: DISCO CORPORATION, Tokyo (JP)

(72) Inventors: Teppei Nomura, Tokyo (JP); Zhiwen Chen, Tokyo (JP); Youngsuk Kim, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 412 days.

(21) Appl. No.: 18/193,766

(22) Filed: Mar. 31, 2023

(65) Prior Publication Data

US 2023/0314234 A1    Oct. 5, 2023

(30) Foreign Application Priority Data

Apr. 1, 2022    (JP) .................................. 2022-061884

(51) Int. Cl.

| | |
|---|---|
| *B23K 1/00* | (2006.01) |
| *B23K 1/005* | (2006.01) |
| *B23K 26/03* | (2006.01) |
| *G01J 5/08* | (2022.01) |
| *G01J 5/48* | (2022.01) |
| *B23K 101/40* | (2006.01) |
| *G01J 5/00* | (2022.01) |

(52) U.S. Cl.
CPC ............ *G01J 5/485* (2022.01); *B23K 1/0016* (2013.01); *B23K 1/0056* (2013.01); *B23K 26/034* (2013.01); *G01J 5/0859* (2013.01); *B23K 2101/40* (2018.08); *G01J 2005/0077* (2013.01)

(58) Field of Classification Search
CPC ............. G01J 5/0007; G01J 2005/0074; G01J 2005/0077; B23K 1/0056; B23K 2101/40; B23K 26/032; B23K 26/034; B23K 26/0665

See application file for complete search history.

(56) References Cited

U.S. PATENT DOCUMENTS 5,052,816 A * 10/1991 Nakamura ............. G01N 25/72
                                                    228/105
5,165,791 A * 11/1992 Miki ..................... G01J 5/0003
                                                    702/135

(Continued)

FOREIGN PATENT DOCUMENTS

| JP | 2008177240 A | 7/2008 |
|---|---|---|
| JP | 2021102217 A | 7/2021 |

*Primary Examiner* — Erin B Saad

(74) *Attorney, Agent, or Firm* — Greer Burns & Crain Ltd.

(57) ABSTRACT

An inspection method includes applying a laser beam to a semiconductor chip to reflow a bump disposed on a surface of the semiconductor chip and included in an irradiation range of the workpiece, the laser beam being applied from an opposite surface of the semiconductor chip, capturing an image of the irradiation range with use of a thermal camera while the laser beam is applied to the semiconductor chip, and acquiring temperature information regarding the semiconductor chip from the captured image, storing in advance reference temperature information that represents temperature information obtained when the semiconductor chip and the board have normally been bonded to each other by the laser beam applied thereto, and determining whether or not the semiconductor chip and the board have normally been bonded to each other by the laser beam applied thereto, on the basis of the reference temperature information and the temperature information.

4 Claims, 6 Drawing Sheets

(56) References Cited

U.S. PATENT DOCUMENTS

| | | | | |
|---|---|---|---|---|
| 5,907,820 | A | * | 5/1999 | Pan .................... G05B 23/0272 |
| | | | | 702/155 |
| 6,095,679 | A | * | 8/2000 | Hammiche ............ G01Q 60/58 |
| | | | | 977/867 |
| 6,747,245 | B2 | * | 6/2004 | Talwar ................. B23K 26/032 |
| | | | | 219/121.8 |
| 7,313,501 | B2 | * | 12/2007 | Nguyen .................. H01L 22/12 |
| | | | | 702/155 |
| 10,031,027 | B2 | * | 7/2018 | Matsumoto ............... G01J 5/52 |
| 2004/0028113 | A1 | * | 2/2004 | Schlagheck ............ G01N 25/72 |
| | | | | 374/57 |
| 2006/0237407 | A1 | * | 10/2006 | Nguyen ............... B23K 1/0056 |
| | | | | 219/121.85 |
| 2019/0391017 | A1 | * | 12/2019 | Ranish .................... G01J 5/025 |
| 2020/0321310 | A1 | * | 10/2020 | Kim ..................... B23K 1/0056 |
| 2021/0202431 | A1 | * | 7/2021 | Kobayashi ........... B23K 26/037 |
| 2021/0215541 | A1 | * | 7/2021 | Coliukos ................ G01R 31/309 |
| 2023/0180395 | A1 | * | 6/2023 | Becker ................. B23K 1/0016 |
| | | | | 228/180.21 |

\* cited by examiner

INSPECTION METHOD

BACKGROUND OF THE INVENTION

Field of the Invention

The present invention relates to an inspection method.

Description of the Related Art

One of the methods of electrically connecting a chip and external terminals in a process of manufacturing semiconductor devices is referred to as a flip-chip mounting method in which the electrodes on chips and the electrodes on a packaged board are directed to face each other and connected to each other through bumps interposed therebetween.

Generally, the flip-chip mounting method employs a mass reflow step that heats the board in its entirety to bond the board and the chips to each other or a thermo-compression bonding (TCB) step that heats and presses each of the chips to bond the board and the chips to each other. However, the mass reflow step suffers an issue of thermal stresses caused by heating the board entirely, and the TCB step has to deal with a concern about poor productivity because it takes time to cool the bonder head.

There has been proposed, as a step superior to the above steps, a laser reflow step for connecting chips to electrodes on a board by way of laser irradiation (see JP 2008-177240A and JP 2021-102217A). The laser reflow step is advantageous in that it reduces thermal stresses as no heat is applied to the board in its entirety and that it has higher productivity than the TCB step because a laser beam is applied to a plurality of chips.

SUMMARY OF THE INVENTION

To determine whether or not the chips have been connected to the board, i.e., whether or not the bonding has been successful, in the above steps, it is necessary to conduct an electrical continuity test. However, there has been no step of inspecting whether or not the bonding has been successful for mass-produced products where daisy chains for assessment are not incorporated.

It is therefore an object of the present invention to provide an inspection method for inspecting whether or not a semiconductor chip has normally been connected to a board.

In accordance with an aspect of the present invention, there is provided an inspection method for inspecting a bonded state between a semiconductor chip and a board, the inspection method including a preparing step of preparing a workpiece including a semiconductor chip having a bump on a surface thereof and a board on which the semiconductor chip is placed with the bump interposed therebetween, a laser beam applying step of applying a laser beam to the semiconductor chip from an opposite surface of the semiconductor chip to reflow the bump included in an irradiation range of the workpiece, a temperature information acquiring step of capturing an image of the irradiation range with use of a thermal camera while the laser beam is applied to the semiconductor chip, and acquiring temperature information regarding the semiconductor chip from the captured image, a storing step of storing in advance reference temperature information that represents temperature information obtained when the semiconductor chip and the board have normally been bonded to each other by the laser beam applied thereto, and a determining step of determining whether or not the semiconductor chip and the board have normally been bonded to each other by the laser beam applied thereto, on the basis of the reference temperature information stored in the storing step and the temperature information acquired in the temperature information acquiring step.

Preferably, the temperature information includes a temperature profile in a cross section of the semiconductor chip. Preferably, the temperature information includes a thermographic image of an upper surface of the semiconductor chip.

Preferably, the determining step includes a step of determining that the semiconductor chip and the board have not normally been bonded to each other, when an area where the temperature information acquired in the temperature information acquiring step is higher than the reference temperature information stored in the storing step is present in the semiconductor chip.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
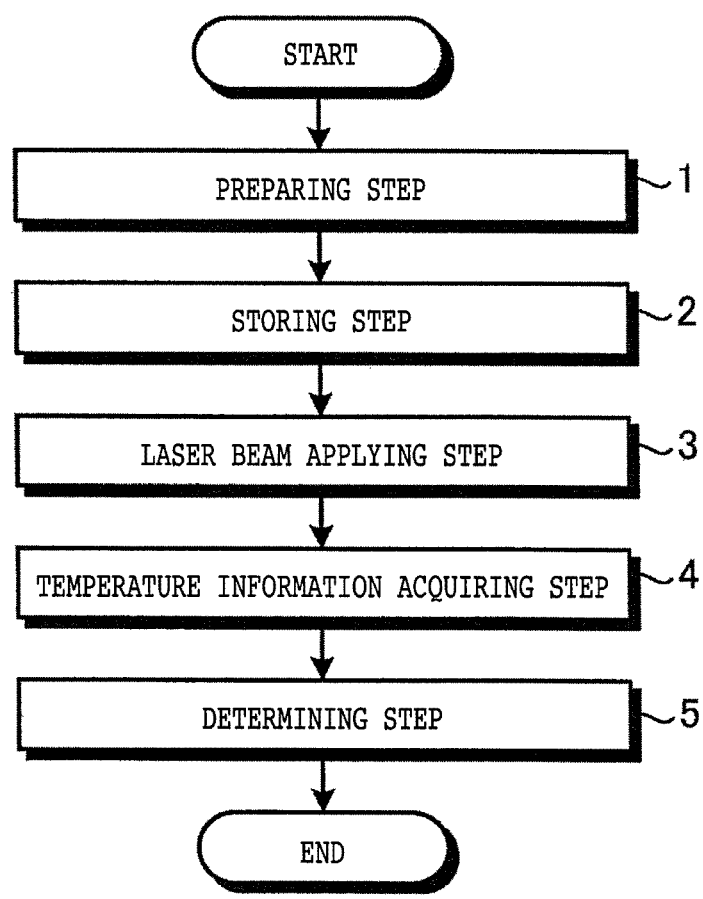
FIG. 1 is a flowchart of a processing sequence of an inspection method according to an embodiment of the present invention.

A preferred embodiment of the present invention will be described in detail hereinbelow with reference to the accompanying drawings. The present invention is not limited to the details of the embodiment described below. The components described below cover those which could easily be anticipated by those skilled in the art and those which are essentially identical to those described below. Further, the arrangements described below can be combined in appropriate manners. Various omissions, replacements, or changes of the arrangements may be made without departing from the scope of the present invention. Identical or corresponding reference characters denote identical or corresponding parts throughout views.

An inspection method according to the embodiment of the present invention will be described in detail hereinbelow with reference to the drawings. FIG. 1 is a flowchart of a processing sequence of the inspection method according to the present embodiment. As illustrated in FIG. 1, the inspection method includes a preparing step 1, a storing step 2, a laser beam applying step 3, a temperature information acquiring step 4, and a determining step 5.

(Preparing Step 1)

Figure 2:
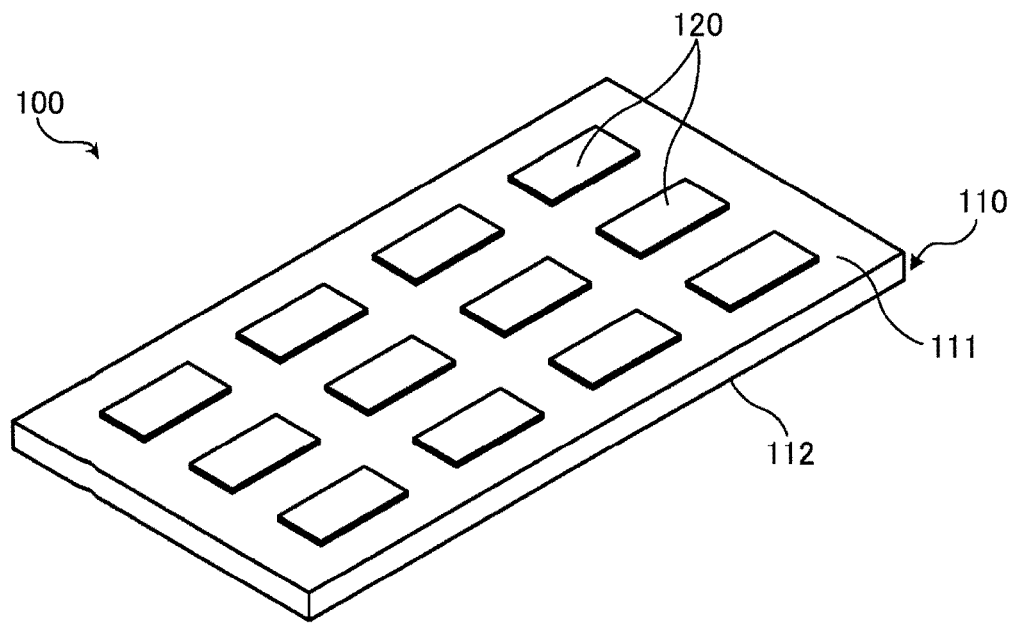
FIG. 2 is a perspective view of a workpiece prepared in a preparing step of the inspection method illustrated in FIG. 1.
Figure 3:
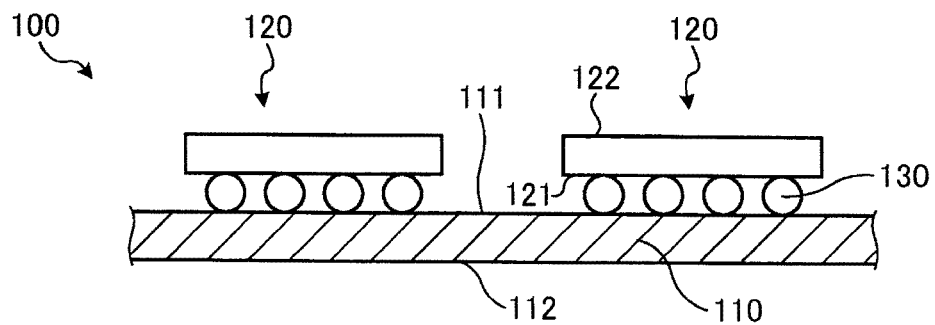
FIG. 3 is an enlarged fragmentary cross-sectional view of the workpiece illustrated in FIG. 2.
Figure 4:
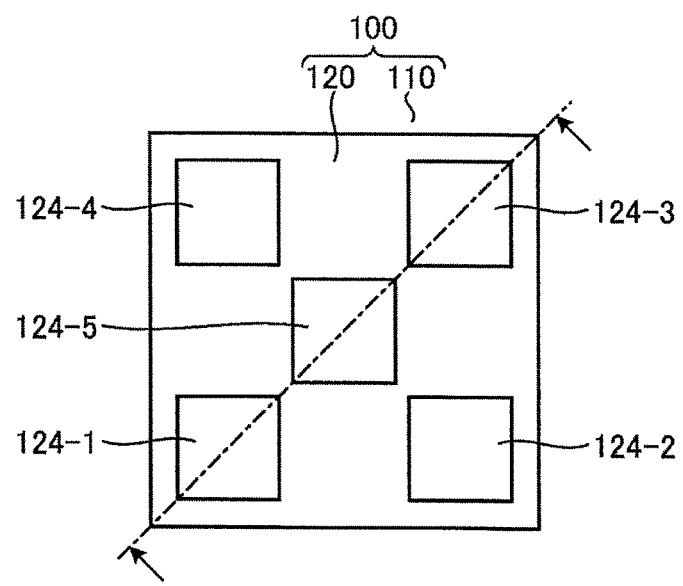
FIG. 4 is a plan view of an assessment chip.

FIG. 2 illustrates in perspective a workpiece 100 prepared in the preparing step 1 illustrated in FIG. 1. FIG. 3 illustrates the workpiece 100 in FIG. 2 in enlarged fragmentary cross section. FIG. 4 illustrates an assessment chip in plan. As illustrated in FIGS. 2 and 3, the workpiece 100 includes a board 110 and a plurality of semiconductor chips 120 having bumps 130.

The preparing step 1 is a step of preparing the workpiece 100 where the semiconductor chips 120 are placed on the board 110. Each of the semiconductor chips 120 has one surface on which the bumps 130 are provided, i.e., a face side 121, facing downwardly, and an opposite surface which is opposite to the face side 121, i.e., a reverse side 122, facing upwardly. The board 110 has a face side 111 facing upwardly and a reverse side 112 facing downwardly opposite the face side 111. The semiconductor chips 120 with the face sides 121 facing downwardly are placed on the face side 111 of the board 110 with the bumps 130 interposed therebetween. Hence, the bumps 130 on the face sides 121 of the semiconductor chips 120 are disposed on the face side 111 of the board 110.

According to the present embodiment, the board 110 is of a rectangular shape. The board 110 is, for example, a printed circuit board (PCB), a device wafer to be divided into device chips, or the like. A plurality of semiconductor chips 120 are disposed on the face side 111 of the board 110 with the bumps 130 interposed therebetween. Each of the semiconductor chips 120 has one or more bumps 130 on the face side 121. The bumps 130 act as protrusive terminals on the face sides 121 of the semiconductor chips 120.

The semiconductor chips 120 will be bonded to electrodes on the board 110 when the bumps 130 are heated and melted. Specifically, the workpiece 100 prepared in the preparing step 1 is destined to have the semiconductor chips 120 flip-mounted on the board 110 by reflowing the bumps 130 with a laser beam 21 (see FIG. 8) applied thereto.

According to the present embodiment, the workpiece 100 includes the semiconductor chips 120 arranged in a two-dimensional array on the board 110 with the bumps 130 interposed therebetween. According to the present invention, however, a workpiece may include a plurality of semiconductor chips 120 stacked on a board 110 with bumps 130 interposed between the stacked semiconductor chips 120.

In order to explain a correlation between temperature information and whether or not bonding has been successful, as described later, assessment chips having a daisy chain for acquiring an electrical continuity of a plurality of areas 124-1, 124-2, 124-3, 124-4, and 124-5 (see FIG. 4) are used as the semiconductor chips 120 according to the present embodiment. In the inspection method according to the present invention, however, the semiconductor chips 120 may not have a daisy chain.

(Storing step 2)

The storing step 2 is a step of storing in advance reference temperature information that represents temperature information obtained when the semiconductor chips 120 and the board 110 have normally been bonded to each other by the laser beam 21 applied thereto. The storing step 2 may be carried out prior to the preparing step 1.

The reference temperature information is information that can be acquired from a thermal image captured by a thermal camera, and is of the same kind as temperature information acquired in the temperature information acquiring step 4 to be described later. In the storing step 2 according to the present embodiment, temperature information obtained when an electrical continuity has been confirmed in all of the areas 124-1, 124-2, 124-3, 124-4, and 124-5 as a result of applying the laser beam 21 to a semiconductor chip 120 as the assessment chip illustrated in FIG. 4 under conditions identical to those in the laser beam applying step 3 to be described later is stored in advance as reference temperature information.

Figure 5:
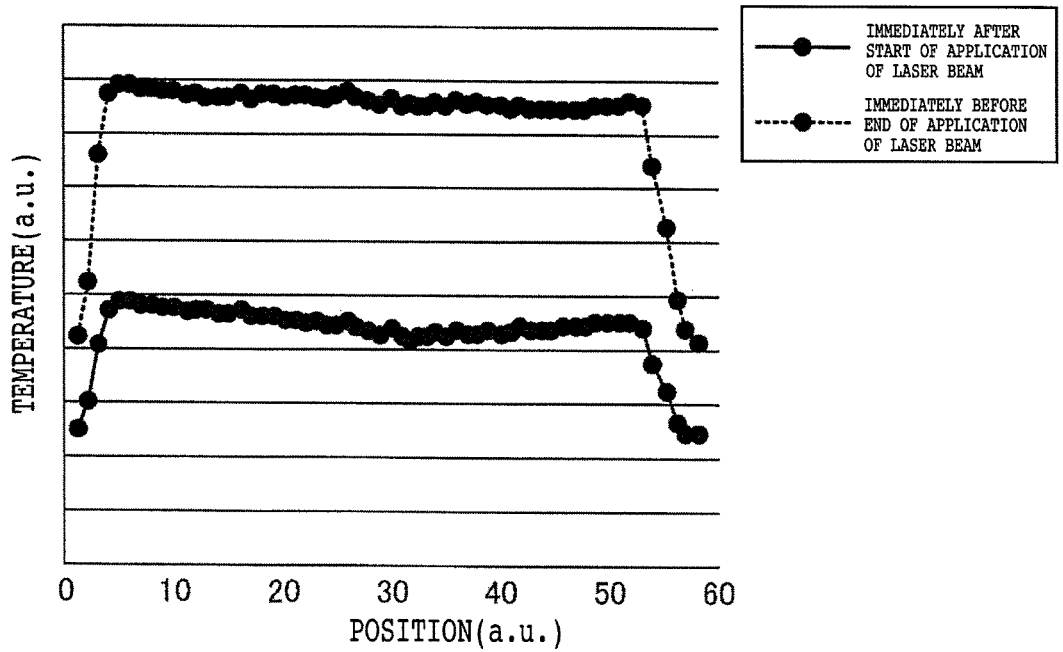
FIG. 5 is a graph illustrating an example of a sectional temperature profile stored in a storing step of the inspection method illustrated in FIG. 1.

FIG. 5 is a graph illustrating an example of a sectional temperature profile stored in the storing step 2 illustrated in FIG. 1. The temperature information includes a temperature profile in a predetermined cross section of the semiconductor chip 120, as illustrated in FIG. 5. The temperature profile represents, in the form of a table or a graph, the relation between the temperatures of various portions in the predetermined cross section of the semiconductor chip 120 and time. According to the present embodiment, the predetermined cross section refers to a cross section along a diagonal line indicated by a dot-and-dash line on the semiconductor chip 120 as illustrated in plan in FIG. 4. The predetermined cross section extends through the areas 124-1, 124-5, and 124-3.

The temperature information illustrated in FIG. 5 indicates a distribution of temperatures at different positions along the diagonal cross section illustrated in FIG. 4. Specifically, the sectional temperature profile representing the reference temperature information, which is illustrated in FIG. 5, includes both information indicating a distribution of temperatures immediately after the start of the application of the laser beam 21 and information indicating a distribution of temperatures immediately before the end of the application of the laser beam 21. Here, the application of the laser beam 21 is executed under laser beam applying conditions identical to those in the laser beam applying step 3 to be described later. In the example illustrated in FIG. 5, the sectional temperature profile exhibits such a tendency that, immediately after the start of the application of the laser beam 21, the temperature of the area 124-1 is slightly higher and the temperature of the area 124-3 is slightly lower. The sectional temperature profile also exhibits such a tendency that, immediately before the end of the application of the laser beam 21, the temperature of the area 124-1 is slightly higher but the temperature distribution then becomes closer to a flat distribution.

Figure 6:
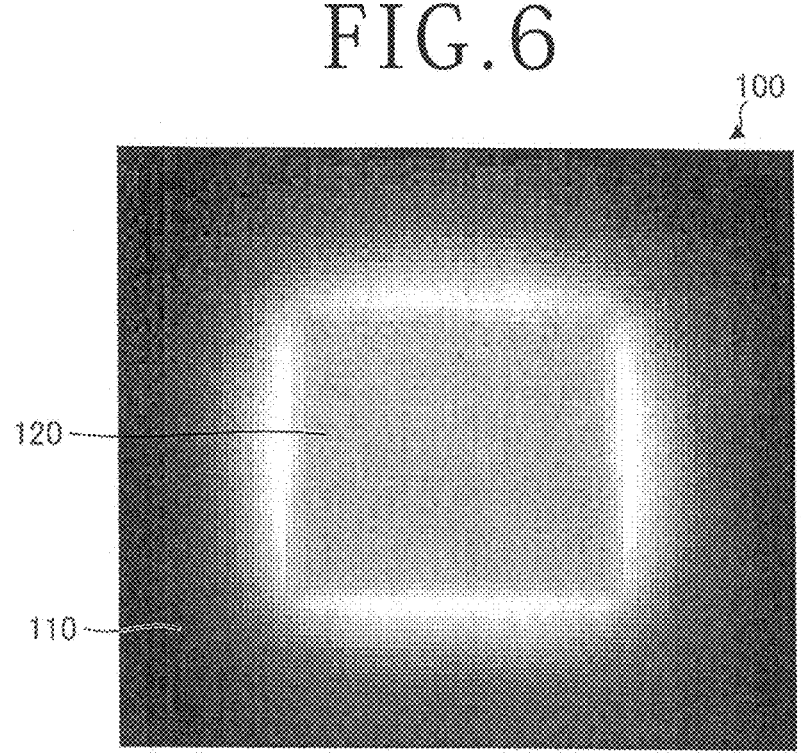
FIG. 6 is a diagram illustrating an example of a thermographic image stored in the storing step of the inspection method illustrated in FIG. 1.

FIG. 6 illustrates an example of a thermographic image stored in the storing step 2 illustrated in FIG. 1. The temperature information includes a captured thermographic image of an upper surface of the semiconductor chip 120 as illustrated in FIG. 6, for example. In the thermographic image illustrated in FIG. 6, different levels of lightness indicate different temperatures such that brighter regions represent higher temperatures and darker regions represent lower temperatures.

The temperature information illustrated in FIG. 6 represents a temperature distribution on the upper surface of the semiconductor chip 120. The thermographic image representing the reference temperature information, which is illustrated in FIG. 6, also includes information indicating a distribution of temperatures immediately before the end of the application of the laser beam 21 under laser beam applying conditions identical to those in the laser beam applying step 3 to be described later. In the example illustrated in FIG. 6, the thermographic image indicates that the levels of lightness inward of the outer edges of the semiconductor chip 120 have a tendency to remain generally constant. A distribution of temperatures converted into numerical values according to the levels of lightness of the thermographic image may be stored in the storing step 2 in association with two-dimensional coordinates.

Figure 7:
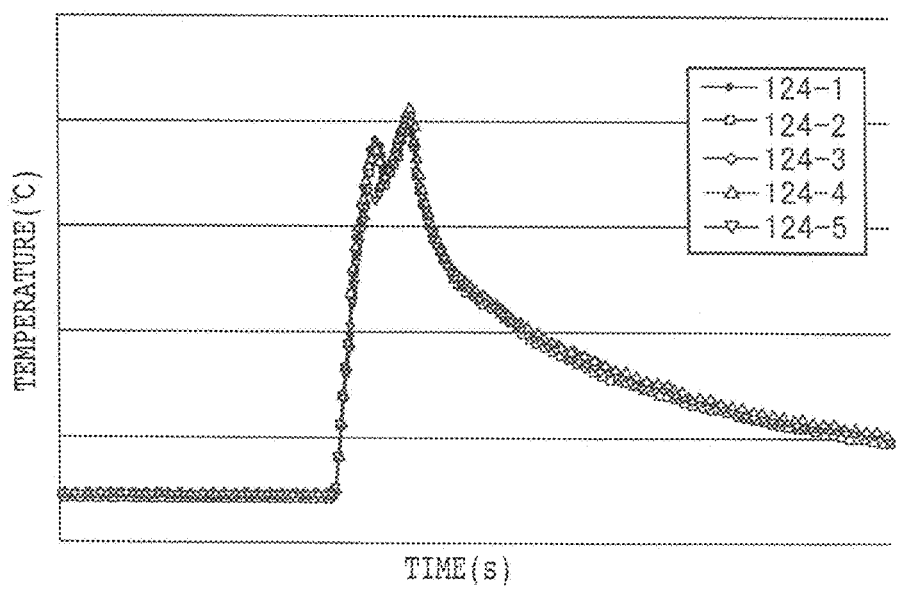
FIG. 7 is a graph illustrating an example of time-dependent changes in the highest temperatures that are stored in the storing step of the inspection method illustrated in FIG. 1.

FIG. 7 is a graph illustrating time-dependent changes in the highest temperatures that are stored in the storing step 2 of the inspection method illustrated in FIG. 1. The temperature information includes time-dependent changes in the highest temperatures as illustrated in FIG. 7, for example. The highest temperatures are acquired from the thermographic image illustrated in FIG. 6, for example. Specifically, the respective highest temperatures are acquired from the areas 124-1, 124-2, 124-3, 124-4, and 124-5 illustrated in FIG. 4, as temperatures corresponding to respective locations where the level of lightness is the highest.

The temperature information illustrated in FIG. 7 represents time-dependent changes in the highest temperatures at the respective areas 124-1, 124-2, 124-3, 124-4, and 124-5 on the upper surface of the semiconductor chip 120. The time-dependent changes in the highest temperatures representing the reference temperature information, which is illustrated in FIG. 7, include time-dependent changes in the highest temperatures at the time when the laser beam 21 is applied under laser beam applying conditions identical to those in the laser beam applying step 3 to be described later. The example illustrated in FIG. 7 exhibits such a tendency that the highest temperatures in the respective areas 124-1, 124-2, 124-3, 124-4, and 124-5 are not largely different from each other over time.

(Laser Beam Applying Step 3)

Figure 8:
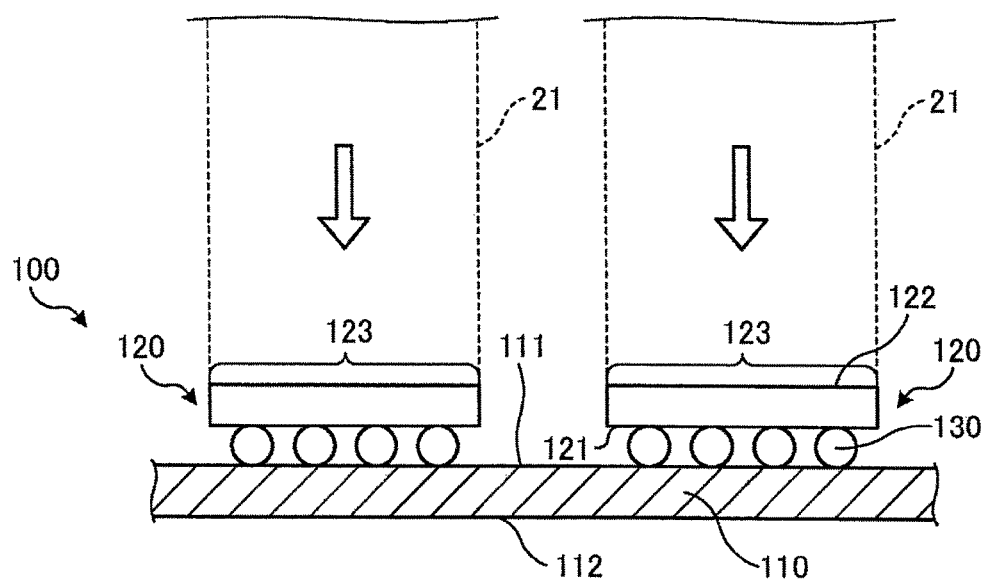
FIG. 8 is an enlarged fragmentary cross-sectional view of a state of the workpiece in a laser beam applying step of the inspection method illustrated in FIG. 1.

FIG. 8 illustrates in enlarged fragmentary cross section a state of the workpiece 100 in the laser beam applying step 3 illustrated in FIG. 1. The laser beam applying step 3 is a step of applying the laser beam 21 to the semiconductor chips 120 to reflow the bumps 130 included in irradiation ranges 123 of the workpiece 100.

The laser beam applying step 3 is carried out by, for example, a laser beam applying apparatus including a holding table for holding the workpiece 100 placed thereon and a laser beam applying unit for emitting and applying the laser beam 21 to the semiconductor chips 120. In the laser beam applying step 3, the board 110 of the workpiece 100 is held on a holding surface of the holding table. At this time, the holding surface faces upwardly and holds the reverse side 112 of the board 110 thereon, and the semiconductor chips 120 are placed on the face side 111 of the board 110 with the bumps 130 interposed therebetween. Then, an alignment step is carried out such that a laser beam emitter of the laser beam applying unit that emits the laser beam 21 faces the holding table and is aligned with each of the semiconductor chips 120.

In the laser beam applying step 3, the laser beam applying unit applies the laser beam 21 from the laser beam emitter to the semiconductor chip 120 in a direction toward the opposite surface thereof, i.e., the reverse side 122, which is opposite to the one surface on which the bumps 130 are provided, i.e., the face side 121. According to the present embodiment, in the laser beam applying step 3, the laser beam 21 is applied to the workpiece 100 for one second with a beam spot output of 102 W. On the face side 121 of the semiconductor chip 120 thus irradiated with the laser beam 21, the bumps 130 in the irradiation range 123 of the semiconductor chip 120 irradiated with the laser beam 21 are reflowed by the heat of the laser beam 21, bonding the semiconductor chip 120 to the board 110.

(Temperature Information Acquiring Step 4)

The temperature information acquiring step 4 is a step of capturing a thermal image of the irradiation range 123 (see FIG. 8) with use of a thermal camera, i.e., an infrared camera, while the laser beam 21 is applied to the semiconductor chip 120, and acquiring temperature information regarding the semiconductor chip 120 from the captured thermal image. The temperature information can be acquired from the thermal image captured by the thermal camera, and is of the same type as the reference temperature information stored in the storing step 2. Specifically, the temperature information includes, for example, a temperature profile in a predetermined cross section of the semiconductor chip 120, information indicating a distribution of temperatures on the upper surface of the semiconductor chip 120, time-dependent changes in the highest temperatures of the semiconductor chip 120, etc.

Figure 9:
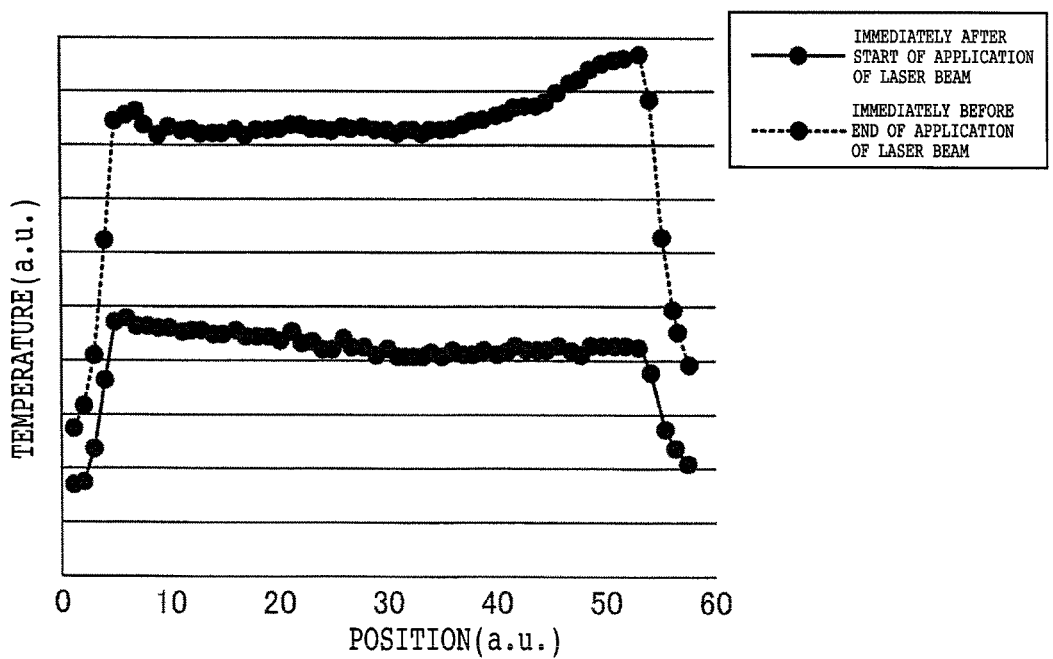
FIG. 9 is a graph illustrating an example of a sectional temperature profile acquired in a temperature information acquiring step of the inspection method illustrated in FIG. 1.
Figure 10:
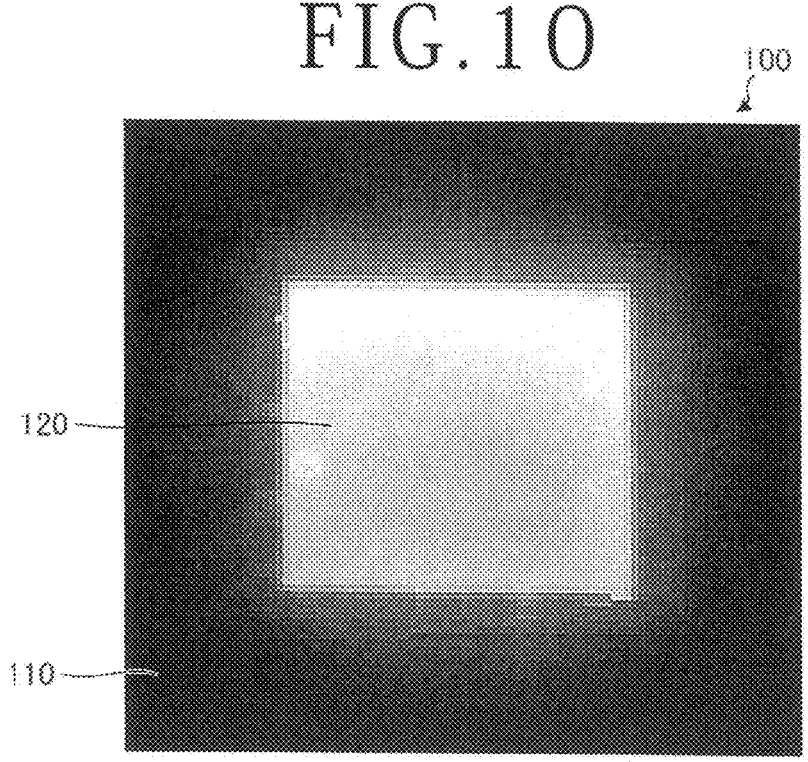
FIG. 10 is a diagram illustrating an example of a thermographic image acquired in the temperature information acquiring step of the inspection method illustrated in FIG. 1.
Figure 11:
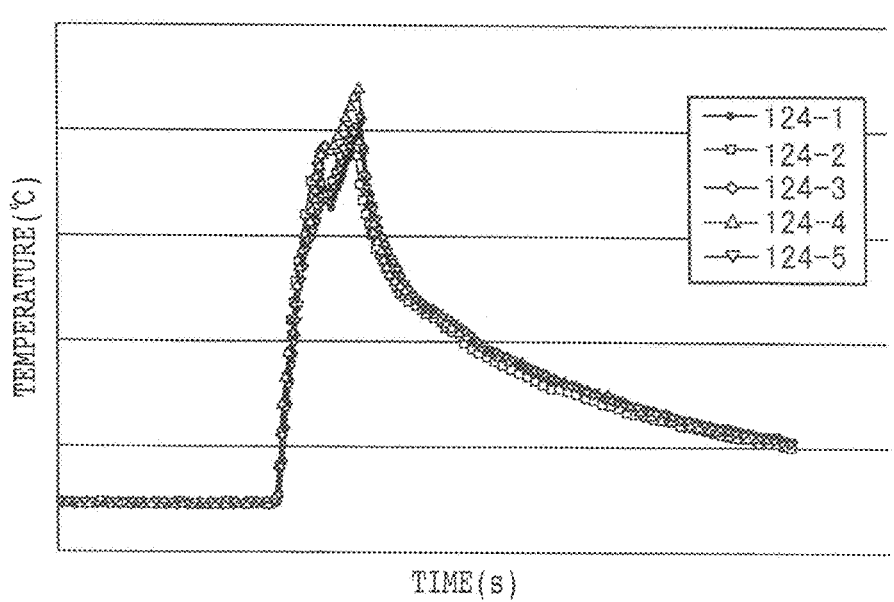
FIG. 11 is a graph illustrating an example of time-dependent changes in the highest temperatures that are acquired in the temperature information acquiring step of the inspection method illustrated in FIG. 1.

It is assumed that, on a workpiece 100, i.e., an assessment chip, from which temperature information has been acquired in examples illustrated in FIGS. 9 through 11, an electrical continuity has been confirmed in the areas 124-1, 124-2, and 124-5 but not in the areas 124-3 and 124-4.

A situation where, in the temperature information acquiring step 4, a temperature profile in a given cross section of the semiconductor chip 120 is acquired as temperature information, i.e., a temperature profile in a given cross section of the semiconductor chip 120 has been stored in advance in the storing step 2, will be described below.

FIG. 9 is a graph illustrating an example of a sectional temperature profile acquired in the temperature information acquiring step 4 illustrated in FIG. 1. The sectional temperature profile acquired in the temperature information acquiring step 4 is acquired with respect to the cross section in which the sectional temperature profile stored in the storing step 2 has been measured. Further, the sectional temperature profile acquired in the temperature information acquiring step 4 includes both information indicating a distribution of temperatures immediately after the start of the application of the laser beam 21 and information indicating a distribution of temperatures immediately before the end of the application of the laser beam 21 in the laser beam applying step 3. Such temperature distribution information is acquired under conditions where the reference temperature information stored in advance in the storing step 2, laser beam applying conditions, sampling counts, periods of time measured from the start of the application of the laser beam 21, etc., are equivalent.

In the example illustrated in FIG. 9, the acquired sectional temperature profile exhibits such a tendency that the temperature of the area 124-1 is slightly higher immediately after the start of the application of the laser beam 21. In addition, the sectional temperature profile exhibits such a tendency that the temperature of the area 124-3 is high immediately before the end of the application of the laser beam 21.

A situation where, in the temperature information acquiring step 4, a captured thermographic image of the upper surface of the semiconductor chip 120 is acquired as temperature information, i.e., a captured thermographic image of the upper surface of the semiconductor chip 120 has been stored in advance in the storing step 2, will be described below.

FIG. 10 illustrates an example of a thermographic image acquired in the temperature information acquiring step 4 illustrated in FIG. 1. The thermographic image acquired in the temperature information acquiring step 4 is captured under image capturing conditions identical to those under which the thermographic image stored in the storing step 2 has been captured. Moreover, the thermographic image acquired in the temperature information acquiring step 4 includes information indicating a distribution of temperatures on the upper surface of the semiconductor chip 120 immediately before the end of the application of the laser beam 21 in the laser beam applying step 3. Such temperature distribution information is acquired under conditions where the reference temperature information stored in advance in the storing step 2, the laser beam applying conditions, the sampling counts, the periods of time measured from the start of the application of the laser beam 21, etc., are equivalent.

In the example illustrated in FIG. 10, the thermographic image exhibits such a tendency that the levels of lightness inward of the outer edges of the semiconductor chip 120 are higher in an upper region in FIG. 10 (corresponding to the areas 124-3 and 124-1 illustrated in FIG. 4) and are lower in middle and lower regions (corresponding to the areas 124-1, 124-2, and 124-5 illustrated in FIG. 4) than those in the upper region. In the temperature information acquiring step 4, providing a distribution of temperatures converted into numerical values according to the levels of lightness of the thermographic image has been stored in the storing step 2 in association with two-dimensional coordinates, a distribution of temperatures may similarly be acquired as numerical values.

Next, a situation where, in the temperature information acquiring step 4, time-dependent changes in the highest temperatures are acquired as temperature information, i.e., time-dependent changes in the highest temperatures have been stored in advance in the storing step 2, will be described below.

FIG. 11 is a graph illustrating an example of time-dependent changes in the highest temperatures that are acquired in the temperature information acquiring step 4 illustrated in FIG. 1. The time-dependent changes in the highest temperatures that are acquired in the temperature information acquiring step 4 are measured in the respective areas where the time-dependent changes in the highest temperatures stored in the storing step 2 have been measured. In addition, the time-dependent changes in the highest temperatures that are acquired in the temperature information acquiring step 4 include the time-dependent changes in the highest temperatures at the time when the laser beam 21 is applied in the laser beam applying step 3. Such time-dependent change information at the highest temperatures is acquired under conditions where the reference temperature information stored in advance in the storing step 2, the laser beam applying conditions, the sampling counts, the periods of time measured from the start of the application of the laser beam 21, etc., are equivalent.

In the example illustrated in FIG. 11, the time-dependent changes in the highest temperatures exhibit such a tendency that the highest temperatures in the areas 124-3 and 124-4 are higher than those in the areas 124-1, 124-2, and 124-5 at their peaks.

(Determining Step 5)

The determining step 5 is a step of determining whether the semiconductor chip 120 and the board 110 have normally been bonded to each other by the laser beam 21 applied thereto, on the basis of the reference temperature information stored in the storing step 2 and the temperature information acquired in the temperature information acquiring step 4.

First, there will be described an example of a determining step in a case where the reference temperature information stored in the storing step 2 and the temperature information acquired in the temperature information acquiring step 4 include a temperature profile in a given cross section of the semiconductor chip 120. In the determining step 5, whether or not the bonding is successful is determined by comparison of the temperature information that includes the sectional temperature profile illustrated in FIG. 9 and that has been acquired in the temperature information acquiring step 4 with the reference temperature information illustrated in FIG. 5 that has been stored in advance in the storing step 2.

Specifically, for example, an acceptable error range for temperatures is preset by use of, as a reference, the sectional temperature profile of the reference temperature information illustrated in FIG. 5, and the bonding may be determined to be successful when the sectional temperature profile acquired in the temperature information acquiring step 4 falls in the acceptable error range, and may be determined not to be successful when the sectional temperature profile includes a portion in excess of the acceptable error range.

A correlation between the sectional temperature profile and the bonded state will be described below. The irradiation ranges 123 (see FIG. 8) of the semiconductor chips 120 that are irradiated with the laser beam 21 should preferably have a constant temperature. In other words, the temperature distribution along the cross section of each of the semiconductor chips 120 of the workpiece 100 should ideally be represented by a rectangular waveform having sharp positive- and negative-going edges and a flat plateau.

In the determining step 5, the bonding can be determined to be successful when the sectional temperature profile is flat immediately before the end of the application of the laser beam 21, as illustrated in FIG. 5. Moreover, it can be determined that a bonding failure has occurred in higher-temperature areas, when the sectional temperature profile is inclined immediately before the end of the application of the laser beam 21, as illustrated in FIG. 9.

Next, there will be described an example of a determining method in a case where the reference temperature information stored in the storing step 2 and the temperature information acquired in the temperature information acquiring step 4 include a captured thermographic image of the upper surface of the semiconductor chip 120. In the determining step 5, whether or not the bonding is successful is determined by comparison of the temperature information that includes the thermographic image illustrated in FIG. 10 and that has been acquired in the temperature information acquiring step 4 with the reference temperature information illustrated in FIG. 6 that has been stored in advance in the storing step 2.

Specifically, for example, an acceptable error range for temperatures is preset by use of, as a reference, the temperature distribution information of the thermographic image of the upper surface of the semiconductor chip 120 according to the reference temperature information illustrated in FIG. 6, and the bonding is determined to be successful when the temperature distribution acquired from the thermographic image illustrated in FIG. 10 acquired in the temperature information acquiring step 4 falls in the acceptable error range, and is determined not to be successful when the temperature distribution includes a portion in excess of the acceptable error range.

A correlation between the temperature distribution on the upper surface and the bonded state will be described below. The irradiation ranges 123 (see FIG. 8) of the semiconductor chips 120 that are irradiated with the laser beam 21 should preferably have a constant temperature. In other words, the semiconductor chip 120 of the workpiece 100 represented by the thermographic image should ideally have a constant level of lightness in the region inward of the outer edges of the semiconductor chip 120.

In the determining step 5, the bonding can be determined to be successful when the level of lightness in the region inward of the outer edges of the semiconductor chip 120 is constant as illustrated in FIG. 6. Moreover, it can be determined that a bonding failure has occurred in higher-lightness areas, when lightness irregularities occur in the region inward of the outer edges of the semiconductor chip 120 as illustrated in FIG. 10.

Next, there will be described an example of a determining step in a case where the reference temperature information stored in the storing step 2 and the temperature information acquired in the temperature information acquiring step 4 include time-dependent changes in the highest temperatures. In the determining step 5, whether or not the bonding is successful is determined by comparison of the temperature information that includes time-depending changes in the highest temperatures illustrated in FIG. 11 and that has been acquired in the temperature information acquiring step 4 with the reference temperature information illustrated in FIG. 7 that has been stored in advance in the storing step 2.

Specifically, for example, an acceptable error range for temperatures is preset by use of, as a reference, the time-dependent changes in the high temperatures of the reference temperature information illustrated in FIG. 7, and the bonding is determined to be successful when the time-dependent changes in the high temperatures illustrated in FIG. 11 that have been acquired in the temperature information acquiring step 4 fall in the acceptable error range, and is determined not to be successful when the time-dependent changes in the high temperatures include a change in excess of the acceptable error range.

A correlation between the time-dependent changes in the high temperatures and the bonded state will be described below. The irradiation ranges 123 (see FIG. 8) of the semiconductor chips 120 that are irradiated with the laser beam 21 should preferably have identical highest temperatures in the areas 124-1, 124-2, 124-3, 124-4, and 124-5. In other words, pieces of data representing the time-dependent changes in the high temperatures in the areas 124-1, 124-2, 124-3, 124-4, and 124-5 should ideally overlap each other over time.

In the determining step 5, the bonding can be determined to be successful when the pieces of data regarding the areas 124-1, 124-2, 124-3, 124-4, and 124-5 generally overlap each other at all times as illustrated in FIG. 7. Moreover, it can be determined that a bonding failure has occurred in higher-temperature areas, when the pieces of data regarding the areas 124-1, 124-2, 124-3, 124-4, and 124-5 include those not overlapping each other as illustrated in FIG. 11.

In the determining step 5, it may be determined that a bonding failure has occurred, when the highest temperature represented by the temperature information exceeds a threshold value which is represented by the highest temperature in the reference temperature information.

In the determining step 5, it can thus be determined that the semiconductor chip 120 and the board 110 have not normally been bonded to each other, when an area where the temperature information acquired in the temperature information acquiring step 4 is higher than the reference temperature information stored in the storing step 2 is present in the semiconductor chip 120, whichever one of the examples referred to above provides the necessary temperature information.

There has been described above a case where a bonding failure is determined to have occurred in higher-temperature areas. However, it may also be determined that a bonding failure has occurred, when a temperature variation in a cross section of the semiconductor chip 120, i.e., a sectional temperature profile, or on the upper surface of the semiconductor chip 120, i.e., a thermographic image, is equal to or larger than a predetermined range or when a lowest temperature in a sectional temperature profile or a thermographic image is equal to or lower than a predetermined value. In this case, whether a bonding failure has occurred may be determined according to a pattern matching step in which the degree of similarity between a sectional temperature profile or a thermographic image that is used as a reference and a sectional temperature profile or a thermographic image that is newly acquired is determined.

As described above, in the inspection method according to the present embodiment, whether or not the bonding has normally been carried out is determined by measuring temperature changes with use of a thermal camera during the bonding step and comparing the measured temperature changes with temperature changes stored in advance in the storing step 2 at the time when the bonding has normally been carried out, i.e., the bonding is successful. This makes it possible to inspect whether or not connections between the chips and the board that have been made are acceptable, at the same time as the determination of the bonding. Thus, those semiconductor chips 120 where connections are not acceptable can be removed or processed again to make connections once more, thereby contributing to an increase in the yield of device chips.

The present invention is not limited to the embodiment described above. Various changes and modifications can be made in the embodiment without departing from the scope of the invention. For example, the storing step 2 may be carried out prior to the preparing step 1. Moreover, for example, when a plurality of workpieces 100 of one kind are to be irradiated with a laser beam and inspected one after another on a production line, the storing step 2 may be carried out only once in a first cycle of the entire step.

Further, in the embodiment described above, the cross section along which the sectional temperature profile is acquired is a cross section along a diagonal line indicated by the dot-and-dash line on the semiconductor chip 120 as illustrated in plan in FIG. 4, passing through areas 124-1, 124-5, and 124-3. However, it may also be a cross section along an opposite diagonal line passing through the areas 124-2, 124-5, and 124-4, or sectional temperature profiles along both cross sections may be stored and determined.

The inspection method according to the present invention may further include a removing step of storing the information regarding a semiconductor chip 120 that is determined to have failed in the bonding in the determining step 5, and removing the semiconductor chip 120 to make it unavailable in subsequent steps. In addition, the inspection method may further include a re-bonding step of applying the laser beam 21 again to a semiconductor chip 120 that is determined to have failed in the bonding in the determining step 5, and pressing the board to re-bond the semiconductor chip 120 to the board.

A laser beam applying apparatus that carries out the inspection method according to the present invention may include a display device for mapping and displaying a bonding failure location on a semiconductor chip 120 that is determined to have failed in the bonding in the determining step 5. Further, the laser beam applying apparatus that carries out the inspection method according to the present invention may include a signaling device for issuing an alarm when a semiconductor chip 120 that is determined to have failed in the bonding in the determining step 5 has more bonding failure locations than a predetermined count and the laser beam applying apparatus is thus determined to have malfunctioned in some way.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. An inspection method for inspecting a bonded state between a semiconductor chip and a board, the inspection method comprising:
   a preparing step of preparing a workpiece including a semiconductor chip having a bump on a surface thereof and a board on which the semiconductor chip is placed with the bump interposed therebetween;
   a laser beam applying step of applying a laser beam to the semiconductor chip from an opposite surface of the semiconductor chip to reflow the bump included in an irradiation range of the workpiece;
   a temperature information acquiring step of capturing an image of the irradiation range with use of a thermal camera while the laser beam is applied to the semiconductor chip, and acquiring temperature information regarding the semiconductor chip from a captured image;
   a storing step of storing reference temperature information that represents temperature information obtained when the semiconductor chip and the board have been properly bonded to each other by the laser beam applied thereto; and
   a determining step of determining whether or not the semiconductor chip and the board have been properly bonded to each other by the laser beam applied thereto, on a basis of the reference temperature information stored in the storing step and the temperature information acquired in the temperature information acquiring step.

2. The inspection method according to claim 1, wherein the temperature information includes a temperature profile in a cross section of the semiconductor chip.

3. The inspection method according to claim 1, wherein the temperature information includes a thermographic image of an upper surface of the semiconductor chip.

4. The inspection method according to claim 1, wherein the determining step includes a step of determining that the semiconductor chip and the board have not been properly bonded to each other, when an area where the temperature information acquired in the temperature information acquiring step is higher than the reference temperature information stored in the storing step is present in the semiconductor chip.

* * * * *